United States Patent [19]

Murai et al.

[11] Patent Number: 4,665,598

[45] Date of Patent: May 19, 1987

[54] EYEGLASS FRAME DECORATED WITH STAINED-GLASS PATTERNS AND METHOD OF MAKING THE SAME

[75] Inventors: Masaru Murai; Hisashi Hujita; Mikio Katayama, all of Fukui, Japan

[73] Assignee: Murai Optical Company, Ltd., Fujui, Japan

[21] Appl. No.: 842,708

[22] PCT Filed: Jul. 24, 1985

[86] PCT No.: PCT/JP85/00420

§ 371 Date: Mar. 10, 1986

§ 102(e) Date: Mar. 10, 1986

[30] Foreign Application Priority Data

Jul. 26, 1984 [JP] Japan ................ 59-112466

[51] Int. Cl.[4] .................. B21D 33/00; G02C 11/02; B44C 5/08
[52] U.S. Cl. .......................... 29/20; 351/51; 428/38; D16/102
[58] Field of Search .............. 29/20; 351/51, 52; D16/102; 428/38

[56] References Cited

U.S. PATENT DOCUMENTS

| | | | |
|---|---|---|---|
| 2,143,141 | 1/1939 | Cooley | 351/51 |
| 2,596,572 | 5/1952 | Lindblom | 351/52 |
| 2,789,381 | 4/1957 | Belgard | 351/51 |
| 3,582,192 | 6/1971 | Gitlin et al. | 351/52 |

Primary Examiner—Howard N. Goldberg
Assistant Examiner—Steven Nichols
Attorney, Agent, or Firm—Birch, Stewart, Kolasch & Birch

[57] ABSTRACT

An eyeglass frame (10) consisting of outside and inside synthetic-resin members (20, 25), a metallic-plate core member (12) sandwiched in between the outside and inside members, the core member (12) being partly formed with a plurality of holes (16) which are filled up with colored resins (18). The outside member is composed of inner, colorless, transparent and outer, colored, opaque layers (21, 22) of which the outer layer is removed partly in the form of a window through which the colored resins (18) and the holes (16) appear as stained-glass patterns.

2 Claims, 7 Drawing Figures

4,665,598

EYEGLASS FRAME DECORATED WITH STAINED-GLASS PATTERNS AND METHOD OF MAKING THE SAME

TECHNICAL FIELD

The present invention relates to an eyeglass frame decorated with stained-glass patterns and a method of making the same.

BACKGROUND ART

As disclosed by JP, A, No. 60-59319, there are two known types of stained glass patterns for decoration of an eyeglass. One type comprises an eyeglass frame provided with a stepped opening, a plate with a plurality holes, colored synthetic resins fitted in the holes, and colorless transparent resin filling the opening in which the plate is previously mounted and the other type consists of a plurality of holes formed in an eyeglass frame and colored synthetic resins fitted in the holes. However, the known patterns are too flat to bring up the image of a stained glass mounted in a building, because the patterns are not set back from but are set even with the surface of the eyeglass frame.

The present invention is intended to solve the problem as described above and provide an eyeglass frame decorated with three-dimensional stained-glass patterns to bring up the image of a stained glass in a building.

DISCLOSURE OF THE INVENTION

In accordance with the invention, the eyeglass frame has outside and inside members made of synthetic resin materials and a core member made of a metal plate. The core member is formed with a plurality of holes which are filled with colored synthetic resins to display stained-glass patterns, the core member being sandwiched in between the outside and inside members. The outside member is composed of inner colorless, transparent layer and outer colored, opaque layer. The outer layer is partly removed to reveal the patterns.

In a method for making the inventive eyeglass frame, molten resins are poured into the holes of the core member and then cured. Thereafter, the core member is put between outside and inside members of which the inside member is of a single colorless, transparent layer. The outside member is of a double-layer, the inner layer being colorless and transparent, the outer layer being colored and opaque. After the outside and inside members are joined with each other by heat, a part of the outer layer, covering the holes, is removed.

The patterns are formed by the holes filled with the colored resins, bordered by the colored outer layer, and set back from the surface of the eyeglass frame. Therefore, whoever looks at the patterns through the inner transparent layer is given the image of a three-dimensional stained glass.

The inventive method needs no more than a simple step of removing a part of the outer layer, in addition to the usual steps of preparing a core member of a metal plate with a plurality of holes, filling up the holes with colored synthetic resins, putting the core member between outside and inside members of a synthetic resin material, and joining the outside and inside members as one body.

BEST MODE OF CARRYING OUT THE INVENTION

Figure 1:
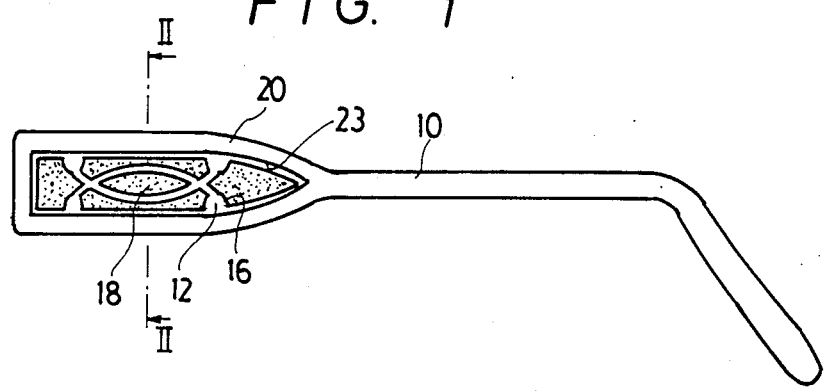
FIG. 1 is a front elevation of the eyeglass frame according to the invention.

The present invention is described in detail below with reference to drawings which illustrate preferred embodiments. As seen in FIG. 1, the eyeglass frame 10 of the invention has an outside member 20 formed with an opening 23 through which stained-glass patterns appear. The stained-glass patterns are composed of a plurality of through holes 16 in a core member 12 and colored synthetic resins 18 fitted in the holes 16. The patterns stand at the bottom of the opening 23 which is set back from the outside surface of the frame. The core member 12 and the colored synthetic resins 18 have a thickness to display the patterns three-dimensional. Thus, whoever looks at the patterns is given an impression of seeing a stained glass mounted in a building.

Figure 2:
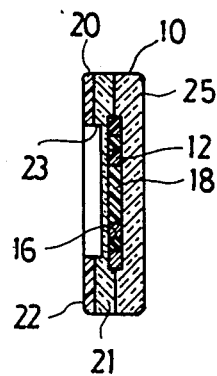
FIG. 2 is an enlarged section taken along the line II—II of FIG. 1.

As seen in FIG. 2 in which a cross-section of the portion decorated with the patterns of the eyeglass frame 10 is shown, the portion has a vertical width larger than other portions. The eyeglass frame 10 is composed of the core member 12 of a metal plate and inside and outside members 20, 25 made of synthetic resin materials. The portion patterned of core member 12 is formed with a plurality of through holes 16 as similar in shape to a stained-glass frame, by press-working or etching. The through holes 16 are filled up with colored synthetic resins 18. The inside member 25 consists of a single, colorless, transparent layer, while the outside member 20 is composed of inner, colorless, transparent and outer, colored, opaque layers 21, 22. The opening 23 has a through bore in the outer layer 22 and a blind bore in the inner layer 25, the latter being connected to the former.

Figure 3:
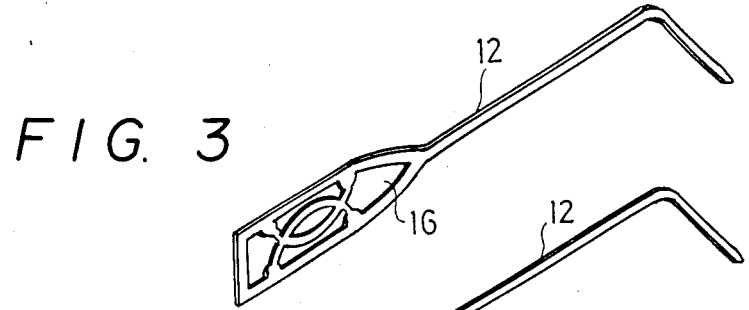
FIGS. 3 to 7 are perspective views illustrating different steps of the method for making the eyeglass frame of FIGS. 1 and 2.

The method of making the eyeglass frame of the invention is described hereinbelow. As seen in FIG. 3, the core member 12 of a metal plate has a wide portion provided with a plurality of holes 16 by press-working or etching in a manner that the wide portion looks like a stained-glass frame.

Figure 4:
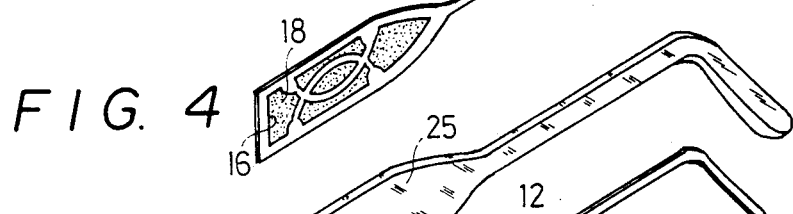

As seen in FIG. 4, resins 18, molten, is poured to fill up the holes 16 in the core member 12 and then cured.

Figure 5:
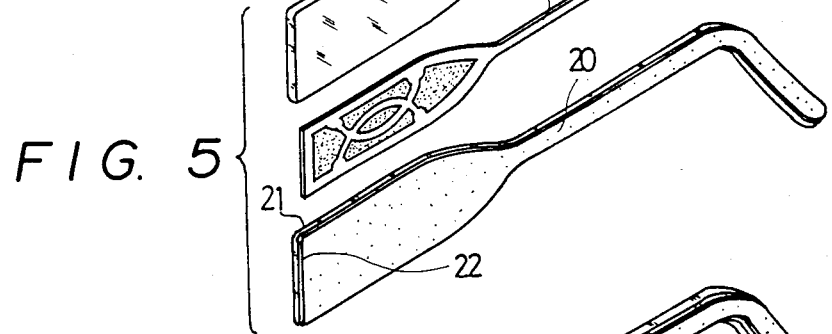

Thereafter, as seen in FIG. 5, the core member 12 is sandwiched in between the outside and outside members 20, 25 and heated with the result that the three members are joined to one body. The outside member 20 consists of inner, colorless, transparent and outer, colored, opaque layers 21, 22. The outside and inside members 20, 25 can have the respective joining surfaces formed with a recess to receive the core member 12, if necessary.

Figure 6:
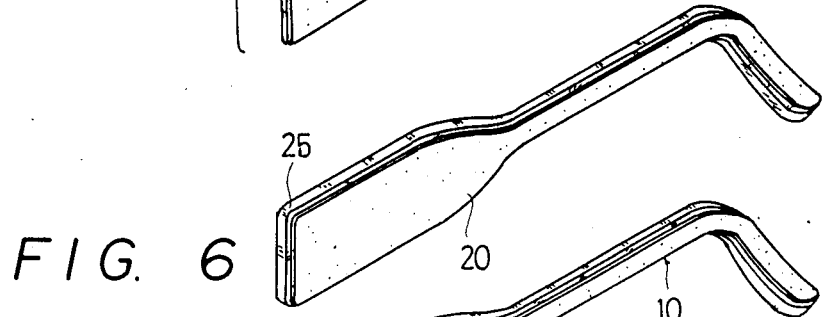

When the outside and inside members 20, 25 are joined to contain the core member therebetween, the core member can not be seen from outside as seen in FIG. 6. The reason for this is that the outside member 20 has the inner colorless transparent layer covered by the outer colored opaque layer.

Figure 7:
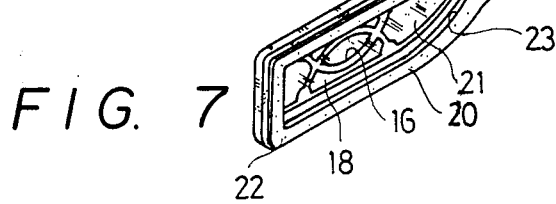

Thereafter, the portion, covering the holes 16 with colored resins 18, of the outer layer 22 is removed by machining so that the eyeglass frame 10 of the invention is formed with the opening 23 in the outside member 20 as seen in FIG. 7. Thus produced eyeglass frame 10 can create the illusion of seeing a window with a stained glass, because the holes 16 and colored resins 18 are bordered with the colored layer 22 and covered by the colorless, transparent layer 21 to display the three-dimensional, stained-glass patterns on the bottom of the opening 23 hollowed from the surface of the frame. The inner, colorless, transparent layer is partly removed together with the outer, colored, opaque layer if necessary.

The portion of outer layer 22 of the outside member 20, covering the holes 16 with the colored resins 18, can be removed in various ways each producing the opening of a different shape. This means that a variety of stained-glass patterns can be derived from the same holes 16 and the similar colored resins 18.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. An eyeglass frame (10) decorated with stained-glass patterns comprising outside and inside members (20, 25) made of synthetic-resin materials and a core member (12) of a metal plate sandwiched in between said outside and inside members, said core member (12) being partly formed with a plurality of holes (16) filled up with colored, synthetic resins (18), characterized in
   that said outside member (20) consists of inner and outer layers (21, 22), said inner layer (21) being colorless and transparent, said outer layer (22) being colored and opaque,
   that said outer layer is partly removed to form an opening (23) through which stained-glass patterns formed by said holes (16) and said colored, synthetic resins (18) can be seen from outside.

2. A method of making an eyeglass frame decorated with stained-glass patterns comprising providing a core member (12) of a metal plate with a plurality of holes (16), filling up said holes (16) with colored, synthetic resins (18), putting said core member (12) between outside and inside members (20, 25) made of synthetic-resin materials, and joining said outside and inside members by heat,
   the improvement comprising fabricating said outside member (20) composed of inner, colorless, transparent and outer, colored, opaque layers (21, 22), and removing a portion covering said holes (16) of said outer layer (22) to form an opening (23) for displaying said colored synthetic resins (18) fitted in said holes (16) as stained-glass patterns.

* * * * *